United States Patent [19]

Veltman

[11] Patent Number: 5,705,218
[45] Date of Patent: Jan. 6, 1998

[54] EXTENDED AGITATION ROTARY STERILIZER

[75] Inventor: Joost Veltman, Aptos, Calif.

[73] Assignee: FMC Corporation, Chicago, Ill.

[21] Appl. No.: 781,634

[22] Filed: Jan. 10, 1997

[51] Int. Cl.$^6$ ............... A23L 1/00; A23L 3/06
[52] U.S. Cl. ............. 426/521; 99/360; 99/361; 99/365; 99/470; 422/25; 422/27; 422/297; 422/302
[58] Field of Search ............... 99/359–371, 468, 99/470, 483; 426/407, 520–523; 422/25–27, 22, 33, 112, 297, 292, 302, 308, 309, 307; 134/65, 132; 165/1, 2, 31

[56] References Cited

U.S. PATENT DOCUMENTS

| | | | |
|---|---|---|---|
| 3,563,161 | 2/1971 | Mencacci | 99/366 |
| 3,815,490 | 6/1974 | Barney, Jr. et al. | 99/366 |
| 4,793,832 | 12/1988 | Veltman et al. | 55/267 |
| 4,874,580 | 10/1989 | Sugisawa et al. | 422/112 |
| 5,215,002 | 6/1993 | Veltman | 99/361 |
| 5,245,916 | 9/1993 | Elizondo et al. | 99/359 |
| 5,259,301 | 11/1993 | Veltman | 99/365 |
| 5,358,030 | 10/1994 | Veltman et al. | 99/470 X |
| 5,456,092 | 10/1995 | Veltman et al. | 62/381 |
| 5,458,261 | 10/1995 | Veltman | 99/366 X |
| 5,472,042 | 12/1995 | Veltman et al. | 422/25 X |
| 5,533,438 | 7/1996 | Veltman | 99/360 |
| 5,535,916 | 7/1996 | Veltman | 99/366 |

*Primary Examiner*—Timothy F. Simone
*Attorney, Agent, or Firm*—Michael B.K. Lee; Douglas W. Rudy

[57] ABSTRACT

The invention provides a rotary processor, which uses magnetic fields to increase the heating or cooling of containers. The invention provides the magnetic fields along the sides of the rotary processor before or after the containers are rotated under the force of friction due to gravity. The magnetic field increase the number of transition phases of rotation, by creating a force of friction caused by the magnets which will rotate the containers and then removing the magnetic fields so that the containers stop rotating.

17 Claims, 3 Drawing Sheets

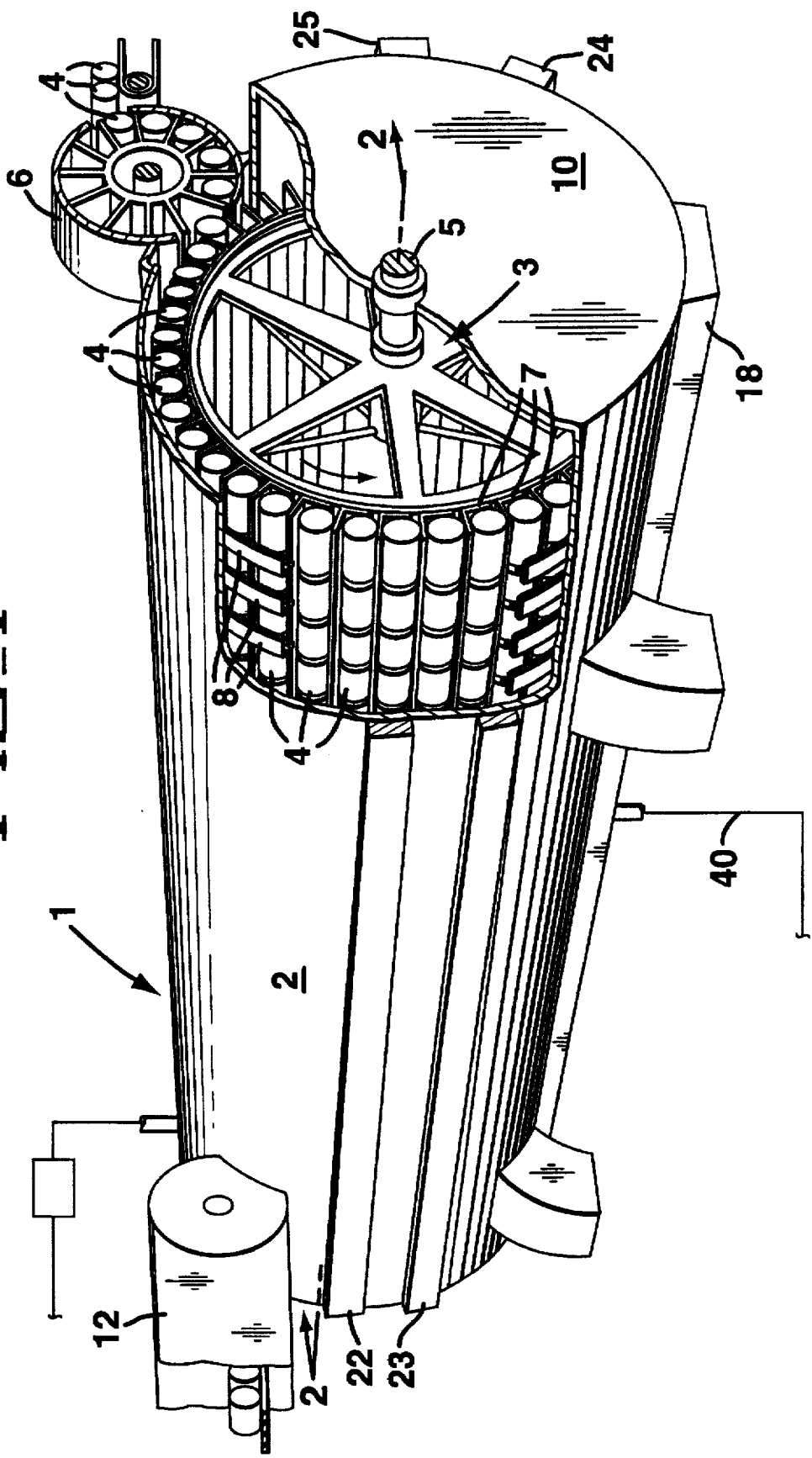
FIG_1

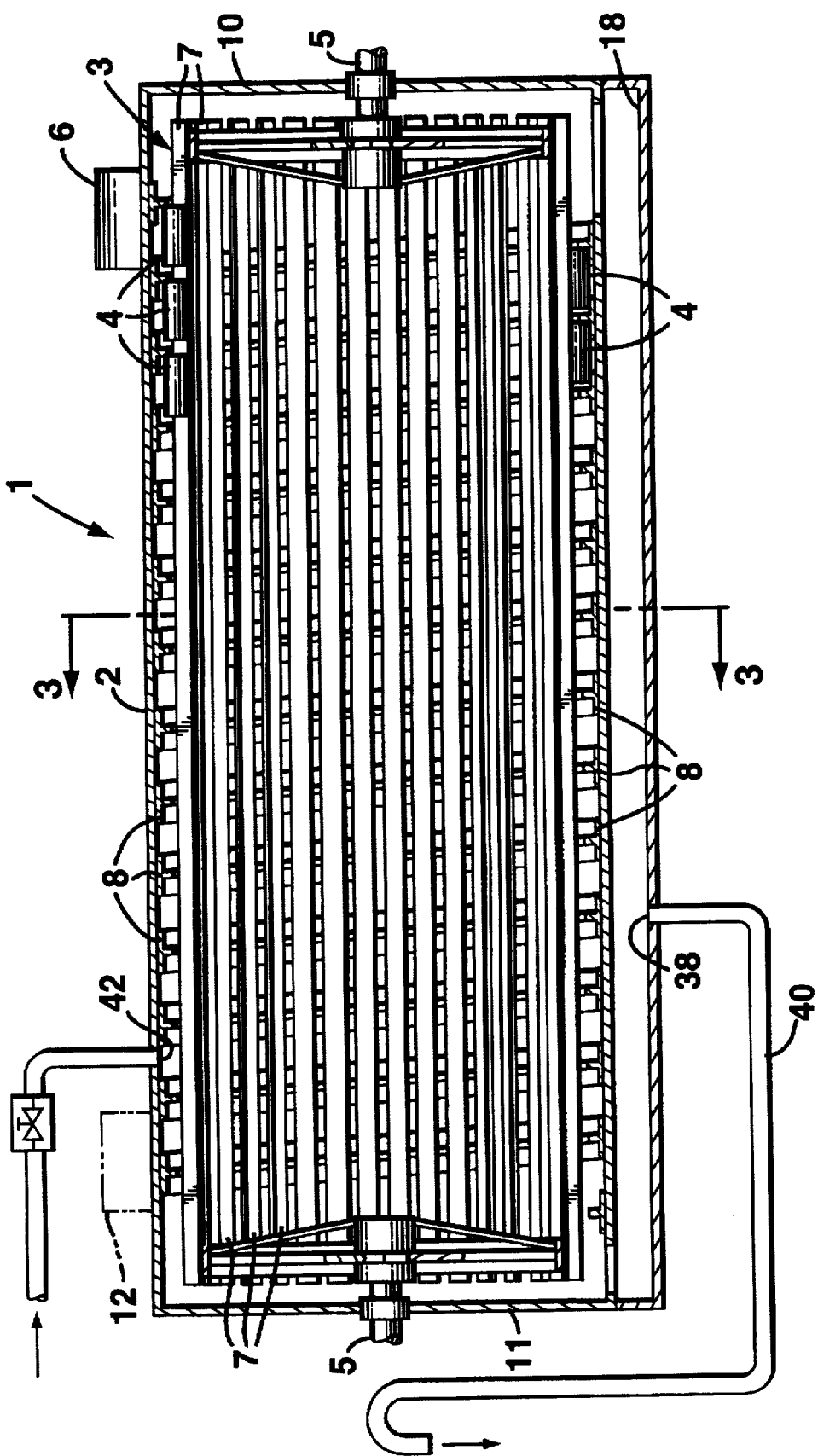

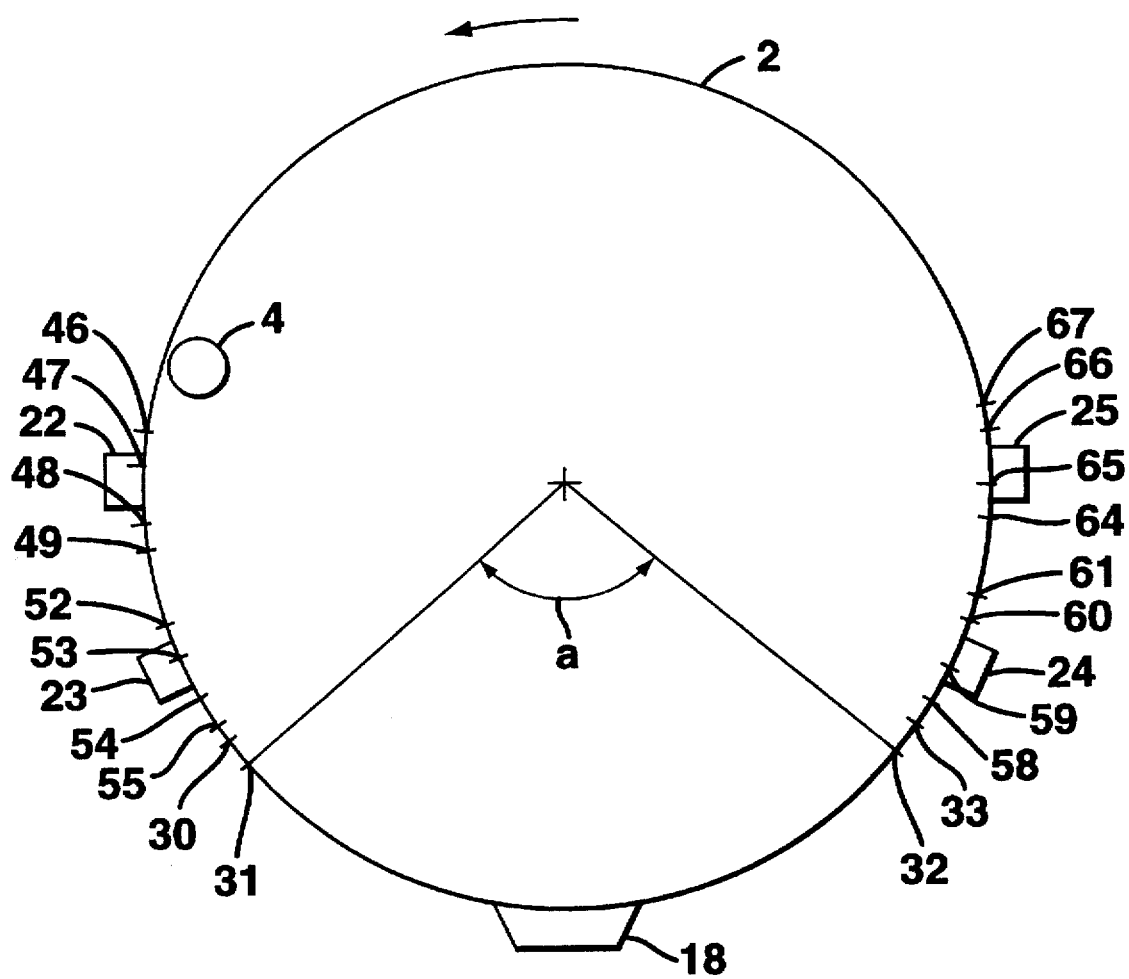
FIG_3

EXTENDED AGITATION ROTARY STERILIZER

BACKGROUND OF THE INVENTION

In continuous, rotary pressure sterilizers for containerized foods, at least one vessel (or shell) is used for processing (heating or cooling) filled containers. Agitation which provides the more efficient heating or cooling occurs in the lower portion of the vessel, where containers are able to roll, and thus provide the agitation. The rotational angle of this agitation process, called "free rotation, is approximately 100 degrees. The rotation angle may vary depending on the product viscosity, container mass, and relative coefficient of friction between the container and the spiral base. A start transition phase is the phase when the product goes through from not rotating at all to rotating with the same speed as the container. A stop transition phase is the phase when the product goes from rotating with the container, to when both the container and product stop rotation. It is during the transition that maximum mixing of the product occurs, which causes maximum heating or cooling. In the prior art rotary sterilizers, there would be a start transition phase and a stop transition phase each time the container makes a cycle around the rotary sterilizer.

SUMMARY OF THE INVENTION

It is an object of the invention to increase the number of transition phases in a rotary sterilizer.

It is another object of the invention to extend the angle over which agitation occurs.

The invention increases the frictional forces between the container and the vessel wall at specific locations. The invention provides a plurality of magnetic fields along a rotary sterilizer.

BRIEF DESCRIPTION OF THE DRAWINGS

FIG. 1 is a perspective view with parts cut away of a single vessel used for heating or cooling.

FIG. 2 is a cross sectional view of the vessel in FIG. 1 along lines 2—2.

FIG. 3 is a schematic cross sectional view of the vessel in FIG. 2 along lines 3—3.

DESCRIPTION OF THE PREFERRED EMBODIMENTS

FIG. 1 is a perspective view of a single vessel 1 with FIG. 2 being a cross sectional view of the vessel in FIG. 1 along lines 2—2. The single vessel 1 of the continuos rotary pressure sterilizer comprises a cylindrical housing 2 having a rotatable reel 3 therein, which rotates around an axle 5 which is journaled in a first end plate 10 and a second end plate 11 that are secured to the housing 2 in pressure tight engagement. In this embodiment, the axle 5 comprises two short stubs at the ends of the cylindrical housing 2 and does not run the entire length of the cylindrical housing 2. The cylindrical housing 2 and the end plates 10, 11 form the single vessel 1. On a first end of the vessel 1 in the region of the first end plate 10 is a feed device 6. On a second side of the vessel 1 in the region of the second end plate 11 is a discharge device 12. A plurality of angle bars 7 extend the length of the reel 3 parallel to the axis of rotation of the reel 3 on the outer circumference of the reel 3. A T-shaped rail 8 forms a spiral on the inside of the housing 2. At the bottom of the vessel 1 is a trough 18.

A condensate drain 38 is located in the trough 18. The condensate drain 38 is connected to a condensate drain tube 40, which is connected to a condensate removal control device. A steam inlet 42 is located in the vessel 1, and is connected to a steam inlet tube in which a steam inlet control valve is located.

FIG. 3 is a schematic cross sectional view of the vessel 1 shown in FIG. 2 along lines 3—3, showing a first magnet 22, a second magnet 23, a third magnet 24, and a fourth magnet 25. The first magnet 22 is placed at approximately the 9 o'clock position along the length of the vessel 1 or the length of the reel 3. The second magnet 23 is placed spaced apart and slightly below and parallel to the first magnet 22. The fourth magnet 25 is placed at approximately the 3 o'clock position along the length of the vessel 1. The third magnet 24 is placed spaced apart and slightly below and parallel to the fourth magnet 25.

In operation of the above embodiment an individual container 4 is provided to the feed device 6, which provides the container to the rotatable reel 3 in the vessel 1. An angle iron 7 on the rotatable reel 3 pushes the can 4 around the rotatable reel 3 in a counter clockwise direction as indicated by the arrow. As the can 4 rotates around the rotatable reel 3, the T-shaped spiral rail 8 pushes the can from near to first end plate 10 towards the second end plate 11. The can is removed from the vessel 1 by a discharge device 12.

During the rotation of the containers around the vessel 1, gravity begins to rotate the containers at a rotation start point 30 shown in FIG. 3. As the containers move from the rotation start point to the free rotation start point 31 the container contents go through a transitional phase of having almost no rotation at the rotation start point 30 to a point of rotating as fast as the container at the free rotation start point 31. During this stare rotation transition phase, the most agitation and mixing to the container contents occurs, providing the most efficient heating. As the containers go from the free rotation start point 31 to a free rotation stop point 32 the contents of the container continues to rotate nearly as fast as the container, providing an agitation and mixing and thus heating that is less efficient than the agitation, mixing, and heating that occurs during the transition phase. In this embodiment the angle of free rotation "a" is approximately 100°. The containers stop rotating at the free rotation stop point 32, while the contents continue to rotate. As the containers move from the free rotation stop point 32 to the rotation stop point 33, the contents transitions from rotating faster than the containers to stopping with the containers. During this stop rotation transitional phase, the most efficient agitation, mixing, and heating of the contents occurs. The start transitional phase and the stop transitional phase, where the most efficient agitation, mixing, and heating of the contents occur, are created by gravity alone. Each phase occurs once as the containers make a revolution around the vessel 1.

First, second, third, and fourth magnets 22, 23, 24, and 25 were added, to increase the number of transition phases. As a container 4 approaches the first magnet 22, neither the container nor its contents are rotating, because gravity is not pulling the container 4 against the vessel wall with sufficient force to create enough of a frictional force to cause the rotation of the container 4. As the container 4 reaches a first magnet rotation start point 46, the first magnet 22 draws the container 4 against the vessel 1 wall increasing the force of friction, causing the container to rotate. The contents goes through a first magnet start rotation transitional phase between the first magnet rotation start point 46 and a first magnet free rotation start point 47. When the container reaches a first magnet free rotation stop point 48, the contents go through a first magnet stop rotation transitional phase between the first magnet free rotation stop point 48 and a first magnet rotation stop point 49. Therefore the first magnet 22 causes two transitional phases causing more efficient heating of the contents.

As a container 4 approaches the second magnet 23, neither the container nor its contents are rotating, because gravity is not pulling the container 4 against the vessel wall with sufficient force to create enough of a frictional force to cause the rotation of the container 4. As the container 4 reaches a second magnet rotation start point 52, the second magnet 23 draws the container 4 against the vessel 1 wall increasing the force of friction, causing the container to rotate. The contents goes through a second magnet start rotation transitional phase between the second magnet rotation start point 52 and a second magnet free rotation start point 53. When the container reaches a second magnet free rotation stop point 54, the contents go through a second magnet stop rotation transitional phase between the second magnet free rotation stop point 54 and a second magnet rotation stop point 55. Therefore the second magnet 23 causes two transitional phases causing more efficient heating of the contents.

As a container 4 approaches the third magnet 24, neither the container nor its contents are rotating, because gravity is not pulling the container 4 against the vessel wall with sufficient force to create enough of a frictional force to cause the rotation of the container 4. As the container 4 reaches a third magnet rotation start point 58, the third magnet 24 draws the container 4 against the vessel 1 wall increasing the force of friction, causing the container to rotate. The contents goes through a third magnet start rotation transitional phase between the third magnet rotation start point 58 and a third magnet free rotation start point 59. When the container reaches a third magnet free rotation stop point 60, the contents go through a third magnet stop rotation transitional phase between the third magnet free rotation stop point 60 and a second magnet rotation stop point 61. Therefore the third magnet 24 causes two transitional phases causing more efficient heating of the contents.

As a container 4 approaches the fourth magnet 25, neither the container nor its contents are rotating, because gravity is not pulling the container 4 against the vessel wall with sufficient force to create enough of a frictional force to cause the rotation of the container 4. As the container 4 reaches a fourth magnet rotation start point 64, the fourth magnet 25 draws the container 4 against the vessel 1 wall increasing the force of friction, causing the container to rotate. The contents goes through a fourth magnet start rotation transitional phase between the fourth magnet rotation start point 64 and a fourth magnet free rotation start point 65. When the container reaches a fourth magnet free rotation stop point 66, the contents go through a fourth magnet stop rotation transitional phase between the fourth magnet free rotation stop point 66 and a fourth magnet rotation stop point 67. Therefore the fourth magnet 25 causes two transitional phases causing more efficient heating of the contents.

Therefore, the addition of the first, second, third, and fourth magnets 22, 23, 24, 25 has increased the number of transitional phases that the content go through for every cycle around the vessel from two to ten.

If the magnetic field is not wide enough or intense enough, the magnetic field may not create free rotation, and instead will provide only a single transitional phase. In the preferred embodiment, the first, second, third, and fourth magnets are permanent magnets. In other embodiments, the other means may be used to create magnetic fields.

If the invention is practiced in a cooling vessel, the magnets then improve the efficiency in cooling the contents of the containers.

The magnets also extend the angle over which the containers rotate. In sterilizers without magnets, the transition phase length is dependent on the speed of the rotation of the reel. The addition of magnets may also stabilize the transitional phase length making it independent of the speed of the rotation of the reel. Since free rotation occurs over an angle of approximately 100°, the magnets could be placed from between a 1 o'clock to 5 o'clock position or a 7 o'clock to 11 o'clock position. This would translate to angles between 30° to 150° from the bottom. Preferably, the magnets are placed between a 2 o'clock to 4 o'clock position or a 8 o'clock to 10 o'clock position. This would translate to angles between 60° to 120° from the bottom.

While preferred embodiment of the present invention has been shown and described herein, it will be appreciated that various changes and modifications may be made therein without departing from the spirit of the invention as defined by the scope of the appended claims.

What is claimed is:

1. An apparatus for processing filled containers, comprising:

a vessel with a vessel wall surrounding a central cavity with a first end and a second end and a top and a bottom, with a length of the vessel extending between the first end and the second end of the vessel;

an axle extending from the first end of the central cavity;

a reel connected to the axle, with a length of the reel extending between the first end and the second end of the vessel wherein the reel has an outer edges, wherein the outer edges of the reel are parts of the reel displaced furthest from the axle and are able to rotate around the axle within the central cavity;

means connected to the outer edges of the reel and extending along the length of the reel for pushing the containers around the reel as the reel is rotated; and a spiral piece on the inside of the central cavity around the reel; and means for creating a first magnetic field on the vessel wall.

2. The apparatus, as recited in claim 1, wherein the means for creating the first magnetic field, is located at a position to create the first magnetic field at a location where gravity does not cause the filled containers to rotate, and wherein the first magnetic field is strong enough to cause the filled containers to rotate.

3. The apparatus, as recited in claim 2, wherein means for creating the first magnetic field, creates the first magnetic field along a linear path with a length parallel to the length of the reel.

4. The apparatus, as recited in claim 3, wherein the means for creating the second magnetic field, is located at a position to create the second magnetic field at a location where gravity does not cause the filled containers to rotate, and wherein the second magnetic field is strong enough to cause the filled containers to rotate.

5. The apparatus, as recited in claim 4, further comprising a means for creating a second magnetic field, which extends along a linear path with a length parallel to the length of the reel and spaced apart from the first magnetic field.

6. The apparatus, as recited in claim 5, further comprising a means for creating a third magnetic field, which extends along a linear path with a length parallel to the length of the reel and spaced apart from the first magnetic field and the second magnetic field.

7. The apparatus, as recited in claim 6, further comprising a means for creating a fourth magnetic field, which extends along a linear path with a length parallel to the length of the reel and spaced apart from the first magnetic field, the second magnetic field, and the third magnetic field.

8. The apparatus, as recited in claim 7, further comprising means for heating the containers.

9. The apparatus, as recited in claim 7, further comprising means for cooling the containers.

10. The apparatus, as recited in claim 7, wherein the means for creating the first magnetic field is a first permanent magnet.

11. The apparatus, as recited in claim 7, wherein the means for creating the second magnetic field is a second permanent magnet.

12. The apparatus, as recited in claim 1, wherein the vessel has a bottom, and wherein the means for creating the first magnetic field is located between 60° to 120° from the bottom of the vessel.

13. The apparatus, as recited in claim 12, wherein means for creating the first magnetic field, creates the first magnetic field along a linear path with a length parallel to the length of the reel.

14. A method for processing filled containers, comprising the steps of:

introducing the filled containers into the vessel;

rotating the filled containers around the vessel in a plurality of cycles by a rotating means, wherein each cycle is a rotation around the vessel, wherein each cycle, comprises the steps of:

starting rotation of the filled containers at a first point where the rotation is from force of friction due to gravity;

stopping the rotation of the filled containers at a second point where the rotation is from force of friction only due to gravity, and wherein the part of the cycle between the first point and the second point is a first region;

starting rotation of the filled containers at a third point outside of the first region, wherein the rotation is from force of friction due to a first magnetic field; and stopping the rotation of the filled containers at a fourth point outside of the first region, wherein the rotation is from force of friction due to the first magnetic field, wherein the part of the cycle between the third point and the fourth point is a second region;

moving the filled containers from a first end of the vessel towards a second end of the vessel; and removing the filled containers from the vessel.

15. The method, as recited in claim 14, wherein each cycle, further comprises the steps of:

starting rotation of the filled containers at a fifth point outside of the first region and the second region, wherein the rotation is from force of friction due to a second magnetic field; and stopping the rotation of the filled containers at a sixth point outside of the first region and the second region, wherein the rotation is from force of friction due to the second magnetic field, wherein the part of the cycle between the fifth point and the sixth point is a third region.

16. The method, as recited in claim 15, further comprising the step of heating the filled containers.

17. The method, as recited in claim 15, further comprising the step of cooling the filled containers.

* * * * *